United States Patent [19]

Hofmann et al.

[11] Patent Number: 5,712,341

[45] Date of Patent: Jan. 27, 1998

[54] PREPARATION OF MIXTURES OF HIGH MOLECULAR WEIGHT POLYISOBUTYLENE AND THERMOPLASTIC POLYMERS

[75] Inventors: Jürgen Hofmann, Ludwigshafen; Thomas Kessler, Schifferstadt; Bernd Lothar Marczinke, Speyer; Sibylle Brosius, Ludwigshafen; Karl-Heinz Fauth, Wattenheim, all of Germany

[73] Assignee: BASF Aktiengesellschaft, Ludwigshafen, Germany

[21] Appl. No.: 529,978

[22] Filed: Sep. 19, 1995

[30] Foreign Application Priority Data

Sep. 19, 1994 [DE] Germany ............ 44 33 273.4

[51] Int. Cl.⁶ .................................... C08J 3/20
[52] U.S. Cl. ............. 524/528; 525/197; 525/240
[58] Field of Search ................. 525/197, 240; 524/528

[56] References Cited

U.S. PATENT DOCUMENTS

| | | | |
|---|---|---|---|
| 2,339,958 | 1/1944 | Sparks | 524/548 |
| 3,230,288 | 1/1966 | Henderson | 264/176 |
| 4,155,655 | 5/1979 | Chiselko et al. | 366/83 |
| 4,352,823 | 10/1982 | Cherukuri et al. | 426/5 |
| 4,892,911 | 1/1990 | Genske | 525/240 |

FOREIGN PATENT DOCUMENTS

| | | |
|---|---|---|
| 035 677 | 2/1981 | European Pat. Off. . |
| 43 19 181 | 7/1992 | Germany . |
| 232826 | 9/1944 | Switzerland . |

OTHER PUBLICATIONS

Ullmann's Encyclopedia, vol. A 21, 4 pp. 555–562, 1992.

Primary Examiner—Thomas R. Weber
Attorney, Agent, or Firm—Keil & Weinkauf

[57] ABSTRACT

Mixtures of high molecular weight polyisobutylene and thermoplastic polymers are prepared in an extruder by a process in which meterable, high molecular weight polyisobutylene is first metered into the extruder and homogenized in at least one kneading stage, heated and subjected to controlled molecular weight degradation and the thermoplastic polymer is then introduced into the polyisobutylene melt by means of a side feed and is subsequently homogenized together with said melt. The novel process is particularly suitable for the preparation of mixtures of high molecualr weight polyisobutylene and polyethylene.

9 Claims, No Drawings

PREPARATION OF MIXTURES OF HIGH MOLECULAR WEIGHT POLYISOBUTYLENE AND THERMOPLASTIC POLYMERS

BACKGROUND OF THE INVENTION

1. Field of the Invention

The present invention relates to a process for the continuous preparation of mixtures of high molecular weight polyisobutylene and thermoplastic polymers in an extruder. The present invention also relates to the mixtures prepared therefrom.

2. Description of the Related Art

It is known that polyisobutylene can be prepared by cationic polymerization with the aid of boron halides, in particular boron trifluoride (EP-A 206 756, U.S. Pat. No. 4,316,973, GB-A 525 542 and GB-A 828 367). The polymerization of the isobutylene can be controlled so that polyisobutylenes having number average molecular weights ($\overline{M}n$) far higher than 1,000,000 can be obtained. Such high molecular weight polyisobutylenes are used, inter alia, in mixtures with other polymers for the preparation of self-adhesive materials and sealing materials.

In mixtures with liquid paraffin and inorganic fillers, polyisobutylenes also give permanently plastic sealants which are usually commercially available in extruded form as tape or as cord having a circular profile.

Owing to the good filler absorption capacity of the high molecular weight polyisobutylene, it is also possible to produce, from mixtures of polyisobutylene with appropriate substances and fillers, sheets which are used for sealing buildings against ground water and seepage water and in corrosion and radiation protection. However, electrically conductive and magnetic sheets based on polyisobutylene also have applications (Ullmann's Encyclopedia of Industrial Chemistry, Vol. A 21, 4. Polyisobutylene, pages 555–561, 1992).

High molecular weight polyisobutylene is frequently also used as a component of blends, ie. mixtures of different polymers, since it often substantially changes the properties of such mixtures. Mixtures of this type are used, inter alia, as components of chewing gums (U.S. Pat. No. 4,352,823).

Mixtures of high molecular weight polyisobutylene and thermoplastic polymers, for example of polyolefins, are now prepared in batchwise trough mixers or in roll mills (Ullmann's Encyclopedia of Industrial Chemistry, Vol. A 21, 4. Polyisobutylene, pages 555–561, 1992). In order to extend the range of use of such mixtures and to make the production more economical, it is however necessary to carry out the preparation continuously in extruders.

In the processes known to date, the preparation of such mixtures is carried out in an extruder by melting together both components of the mixture and then homogenizing the melt. However, the resulting mixtures are very inhomogeneous and not gel-free. If the homogenization step is carried out for a longer time in order thus to obtain more homogeneous mixtures, the high molecular weight polyisobutylene is so greatly degraded by shearing that the resulting mixtures are tacky to such an extent that they can no longer be correctly metered. This is now avoided by relying on the use of blade-kneaders, but this is complicated in terms of process engineering.

It is an object of the present invention to remedy the disadvantages described and to provide an improved process for the preparation of homogeneous mixtures of high molecular weight polyisobutylene and thermoplastic polymers, which leads to gel-free and nontacky mixtures without complicated process engineering.

SUMMARY OF THE INVENTION

We have found that an improved process is achieved for the continuous preparation of mixtures of high molecular weight polyisobutylene and thermoplastic polymers in an extruder, wherein meterable, high molecular weight polyisobutylene is first metered into the extruder and homogenized in at least one kneading stage, heated and subjected to controlled molecular weight degradation and the thermoplastic polymer is then introduced into the polyisobutylene melt by means of a side feed and is subsequently homogenized together with said melt.

DESCRIPTION OF THE PREFERRED EMBODIMENTS

The novel process is carried out in an extruder, preferably in a twin-screw extruder. Such twin-screw extruders are sold by, inter alia, Werner & Pfleiderer under the trade name ZSK.

The mixture resulting from the novel process contains, inter alia, a high molecular weight polyisobutylene having a number average molecular weight $\overline{M}n$ of at least 80,000, in particular from 100,000 to 1,000,000.

Such high molecular weight polyisobutylenes are obtainable, inter alia, by cationic polymerization of isobutylene by the belt method, isobutylene in pure, dried, liquid ethylene being subjected to cationic polymerization on a slightly inclined, continuous belt with the aid of boron trifluoride (DE-A 3 527 551). Furthermore, such high molecular weight polyisobutylenes are sold under the trade name Oppanol® by BASF Aktiengesellschaft.

Among the thermoplastic polymers used in the novel process are polystyrene, polymethyl methacrylate, polymethyl acrylate, polyester, polycarbonate or diene-containing polymers. Such a mixture preferably contains polyolefins as thermoplastic polymers.

In addition to polyethylene, polyolefins used may also include polypropylene and polybut-1-ene and the corresponding copolymers of ethylene, of propylene and of but-1-ene, and the latter may also contain minor amounts of higher $C_5$-$C_8$-alk-1-enes. A polyethylene having a density of from 0.89 to 0.93, in particular from 0.90 to 0.928, g/cm$^3$ at room temperature is preferably used in the homogeneous mixture.

Such polyolefins can be prepared by the polymerization processes conventionally used in industry, for example by high pressure polymerization with the aid of free radical initiators, by polymerization with Ziegler or with Ziegler-Natta catalysts and with Phillips catalysts or by polymerization with metallocene-containing catalysts. The polymerization can be carried out in the gas phase, in solution or in suspension, both continuously and batchwise. Such preparation processes are known to persons skilled in the art for work in the plastics industry.

The homogeneous mixtures obtained by the novel process usually consist of from 10 to 90, in particular from 30 to 80, % by weight of high molecular weight polyisobutylene and from 90 to 10, in particular from 70 to 20, % by weight of the thermoplastic polymer.

The preparation of the homogeneous mixture is carried out in particular by first heating the high molecular weight polyisobutylene to 160°–300° C., in particular 180°–240°

C., in at least one kneading stage in an extruder equipped with a melting zone and a plurality of mixing zones, homogenizing said polyisobutylene and subjecting it to controlled molecular weight degradation. The high molecular weight polyisobutylene is introduced into the extruder as meterable, nontacky granules or milled material, usually at from 0° to 100° C., in particular from 10° to 50° C., and is then heated there.

By means of a second metering step, the thermoplastic polymer is then introduced via a side feed into the polyisobutylene melt and is homogenized together with the latter at from 180° to 270° C., in particular from 190° to 240° C.

The novel process is carried out in an extruder, preferably during residence times of from 0.5 to 5, in particular from 2 to 4, minutes for the mixture to be homogenized. The extruder is operated at a speed of from 50 to 300, in particular from 100 to 250, revolutions/minute.

As a result of separately metering in the high molecular weight polyisobutylene on the one hand and thermoplastic polymer on the other hand, very homogeneous, gel-free and nontacky mixtures are obtained in a simple manner. These mixtures, which are likewise according to the invention, have melt flow indices of from 0.1 to 200, in particular from 1.0 to 100, g/10 min at 190° C. and under a weight of 21.6 kg. The melt flow indices are determined according to DIN 53 735.

The resulting mixtures of high molecular weight polyisobutylene and thermoplastic polymers are suitable, inter alia, for the production of films, fibers or moldings.

EXAMPLES

Example 1 according to the invention and Comparative Example A were carried out in a twin-screw extruder of type ZSK 57 from Werner & Pfleiderer, which was equipped with a melting zone and three mixing zones.

Example 1

In the twin-screw extruder described, 75 parts by weight of a high molecular weight polyisobutylene having a number average molecular weight $\overline{M}_n$ of 425,000 (Oppanol® 150, from BASF Aktiengesellschaft) were first metered into the extruder feed, melted there at 190° C., mixed and extruded. The twin-screw extruder had a length/diameter ratio of 21. The feed barrel was cooled with water and the remaining 6 barrel sections were electrically heated to 200° C. The extruder speed was 188 revolutions/minute and the torque load was 90% at a throughput of 55 kg/hour. After melting of the high molecular weight polyisobutylene, 25 parts by weight of a polyethylene having a density of 0.927 g/cm$^3$ at room temperature were forced through a side metering means (ZSB 40) into the fourth barrel section of the extruder, separately from the high molecular weight polyisobutylene. The specific energy consumption was 0.398 kWh/kg. 73 kg of a homoegeneous mixture having a melt flow index of 29.8 g/min at 190° C. and 21.6 kg according to DIN 53 735 were obtained.

The resulting mixture was virtually gel-free and had a film rating (determined by visual assessment) of 2 and was therefore suitable for film production. The tendency of the resulting mixture to be tacky was greatly reduced.

Comparative Example A

The high molecular weight polyisobutylene and the polyethylene were blended with one another in the extruder set up of novel Example 1, except that 75 parts by weight of the high molecular weight polyisobutylene and 25 parts by weight of the polyethylene were metered together into the extruder feed via two differential metering apparatuses from K-tron Soder and melted together, mixed and extruded.

Under conditions otherwise identical to those in Example 1, in this case the throughput was 44 kg/hour and the specific energy consumption was 0.445 kWh/kg. 73 kg/h of an insufficiently homogeneous mixture having a melt flow index of 28.3 g/10 min at 190° C. and 21.6 kg according to DIN 53 735 were obtained.

The resulting mixture had a high gel content and, owing to a film rating of 3 (determined by visual assessment), was unsuitable for film production. In addition, the mixture obtained had a strong tendency to be tacky, owing to high contents of low molecular weight polyisobutylene.

A comparison of novel Example 1 and Comparative Example A shows, inter alia, that a very homogeneous, gel-free and nontacky mixture is obtained with the aid of the novel process, in particular by separately metering in high molecular weight polyisobutylene on the one hand and a thermoplastic polymer on the other hand at different times.

We claim:

1. A process for the continuous preparation of a mixture of high molecular weight polyisobutylene and a thermoplastic polymer in an extruder, which process consists essentially of motoring the high molecular weight polyisobutylene as meterable, non-tacky granules or milled material in the absence of the thermoplastic polymer into the extruder and homogenizing the polyisobutylene in at least one kneading stage, heating and subjecting the polyisobutylene to controlled molecular weight degradation, and thereafter introducing the thermoplastic polymer into the polyisobutylene melt by means of a side feed and subsequently homogenizing the thermoplastic polymer together with said melt.

2. The process of claim 1, wherein a twin-screw extruder is used.

3. The process of claim 1, wherein the high molecular weight polyisobutylene has a number average molecular weight of from 80,000 to 1,000,000 is used.

4. The process of claim 1, wherein the thermoplastic polymer is a polyolefin.

5. The process of claim 1, wherein the thermoplastic polymer used is polyethylene.

6. The process of claim 1, wherein the high molecular weight polyisobutylene is heated in at least one kneading stage to 160°–300° C., homogenized and subjected to controlled molecular weight degradation.

7. The process of claim 1, wherein the thermoplastic polymer and the polyisobutylene melt are homogenized together at from 180° to 270° C.

8. The process of claim 1, wherein the extruder is operated at speeds of from 50 to 300 revolutions/minute.

9. A homogeneous mixture of high molecular weight polyisobutylene and thermoplastic polymer, obtained by the process of claim 1.

* * * * *

UNITED STATES PATENT AND TRADEMARK OFFICE
CERTIFICATE OF CORRECTION

PATENT NO. : 5,712,341
DATED : January 27, 1998
INVENTOR(S) : HOFMANN et al.

It is certified that error appears in the above-identified patent and that said Letters Patent is hereby corrected as shown below:

Column 4, claim 1, line 31, "motoring" should be --metering--.

Column 4, claim 5, line 48, delete "used".

Signed and Sealed this

Fourteenth Day of April, 1998

Attest:

BRUCE LEHMAN

Attesting Officer

Commissioner of Patents and Trademarks